J. LOVATT, dec'd.
MARY ANN LOVATT & T. G. SWARTWOUT, Exec'rs. G. B. TURRELL, Assignee.
SKATES.
No. 7,151.
Reissued May 30, 1876.
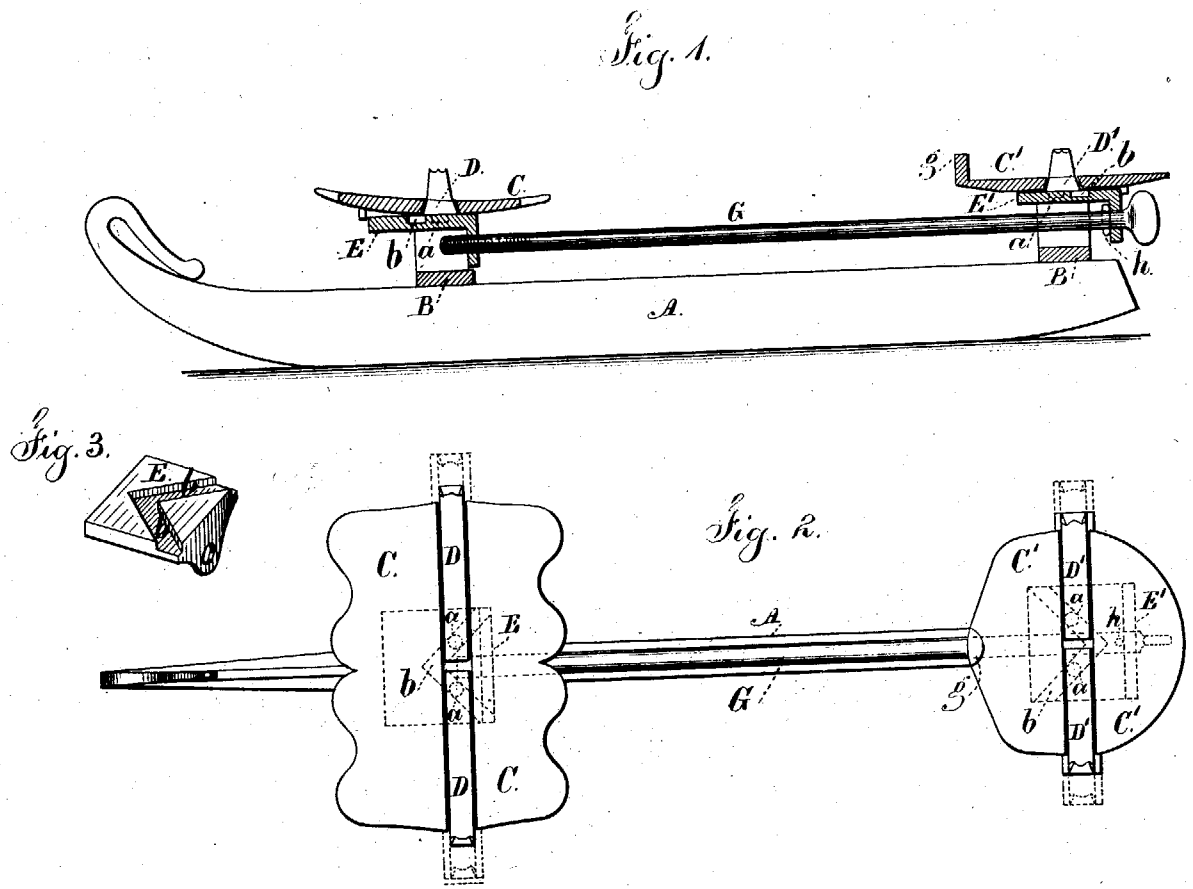
Witnesses
Chas. H. Smith
Harold Terrell.
Inventor
John Lovatt, Deceased
Geo. B. Turrell, Assignee
per Lemuel W. Serrell Atty.

UNITED STATES PATENT OFFICE.

GEORGE B. TURRELL, OF SOUTH ORANGE, NEW JERSEY, ASSIGNEE OF MARY ANN LOVATT AND THOMAS G. SWARTWOUT, EXECUTORS OF JOHN LOVATT, DECEASED.

IMPROVEMENT IN SKATES.

Specification forming part of Letters Patent No. 28,495, dated May 29, 1860; reissue No. 3,186, dated November 10, 1868; extended seven years; reissue No. 6,369, dated April 6, 1875; reissue No. 7,151, dated May 30, 1876; application filed April 22, 1876.

*To all whom it may concern:*

Be it known that JOHN LOVATT, formerly of Newark, in the county of Essex and State of New Jersey, now deceased, did invent a new and useful Improvement in Clamping-Skates to Boots or Shoes; and the following is declared to be a full, clear, and exact description thereof, reference being had to the accompanying drawings, forming a part of this specification.

Before this invention a skate had been made with clamps to hold the skate to the sole and heel of the boot or shoe, and such clamps were movable, to accommodate varying sizes of boots and shoes, and retained in position by bolts and nuts that held the clamps to the sole or heel plates.

The nature of the present invention consists in the combination, with a skate and lateral acting clamps, of mechanism that operates to move the clamps toward each other with sufficient force to cause them to grasp the sole, and hold the skate to the boot or shoe.

In the drawings, the improved skate is represented in one of the forms devised by said LOVATT.

Figure 1 is a longitudinal vertical section, taken through the heel and sole plates, showing the screw-rod and movable pieces for adjusting the clamps for the sole of the boot. Fig. 2 is a top view of the skate, showing the four clamps and the movable slotted blocks. Fig. 3 is a perspective view of one of the slotted blocks detached from the foot-plate of the skate.

A represents the runner or skate-iron, of any suitable shape; and B B are the standards, which support the heel and sole plates C C′, and to which the heel and sole plates are secured. These plates are of sufficient length and width to give a firm and steady bearing for the feet. D D D′ D′ are the clamp-bars, which have their edges beveled down, so that they will fit in suitable slots made to receive them in the plate C C′. Their ends are turned up and slightly over, and made sufficiently sharp to serve as jaws, which will grasp the edges of the leather sole or heel firmly. These clamping-jaws are shown by dotted lines, Fig. 1, as made with pins *a a* projecting into grooves or slots *b* in moving plates or blocks E E′. These moving plates or blocks are represented as under the sole and heel plates C C′, and suitably held to these plates between guides, which only allow them to have a longitudinal movement. The grooves *b* are cut into the faces of moving plates or blocks E E′ in a wedge or V-shape, the angles of which are in opposite directions, so that a rod, G, having a screw-thread cut on its front end, and tapped through a projecting lip of the block E, and passing loosely through a similar projecting lip or block, E′, can be made by screwing it up to move the blocks toward each other to contract the jaws, or by the reverse movement to open the jaws.

By this device the longitudinal movement of the motor communicates a lateral movement to the clamps through the agency of such inclined or V-shaped surfaces.

The screw-rod G works loosely in the lip of the heel-block E′, and is tapped with a screw-thread through the lip of plate or block E, as above described. It has a thumb-piece on its end, which is entirely out of the way in skating, but is very conveniently operated to tighten or loosen the clamps. The power obtained from the screw, operating upon the lateral clamps, is sufficient to move said clamps, and cause them to grasp the sole with the force required for firmly holding the skates to the boot or shoe, and when one pair of clamps closes upon the heel or sole the clamp-operating mechanism is not arrested in its movement, but is continued so as to close the other pair of clamps, and hence both pairs of clamps are properly closed, and nearly the same pressure is exerted upon all the clamps, and the pressure upon one clamp becomes a resistance in operating the other, because the parts operate in opposite directions.

In consequence of using slots and pins between the actuating power and the clamps, the actuating power is rendered much more efficient upon the clamps, and when these moving plates or blocks are used as shown, the clamps on the sole and heel are operated simultaneously.

The lug or shoulder *g*, projecting up from the front of the plate, is to prevent the boot slipping forward, and may be placed either upon the heel-plate, as shown, or upon the front of the sole-plate, when the plate is made the full length. A pin, *h*, through the rod G loosens the clamps of the skates from the boot when the screw is turned backward.

What is claimed as the invention of the said LOVATT, is—

1. The combination, in a skate, of laterally-sliding clamps for grasping the sole, a plate or rest for the foot, and mechanism for moving and holding the clamps, substantially as specified.

2. The combination, with the clamps for grasping the sole and clamps for grasping the heel, of mechanism acting between such clamps in opposite directions, so that one set of clamps acts as a resistance in closing the other set of clamps, substantially as set forth.

3. The combination, in a skate, of laterally-moving clamps, pins, inclined slots, and mechanism for operating and holding such clamps, substantially as set forth.

4. The combination, in a skate, of a plate or rest for the foot, laterally-sliding clamps, mechanism that moves and holds such clamps and transfers a longitudinal motion into a transverse motion, and clamps for grasping the heel, substantially as spe fied.

Signed this 19th day of April, A. D. 1876.

GEO. B. TURRELL.

Witnesses:

GEO. T. PINCKNEY,

HAROLD SERRELL.